J. V. LAFOND.
HANDLE AND PROTECTOR FOR TEAKETTLES.
APPLICATION FILED FEB. 17, 1920.
1,388,958.
Patented Aug. 30, 1921.
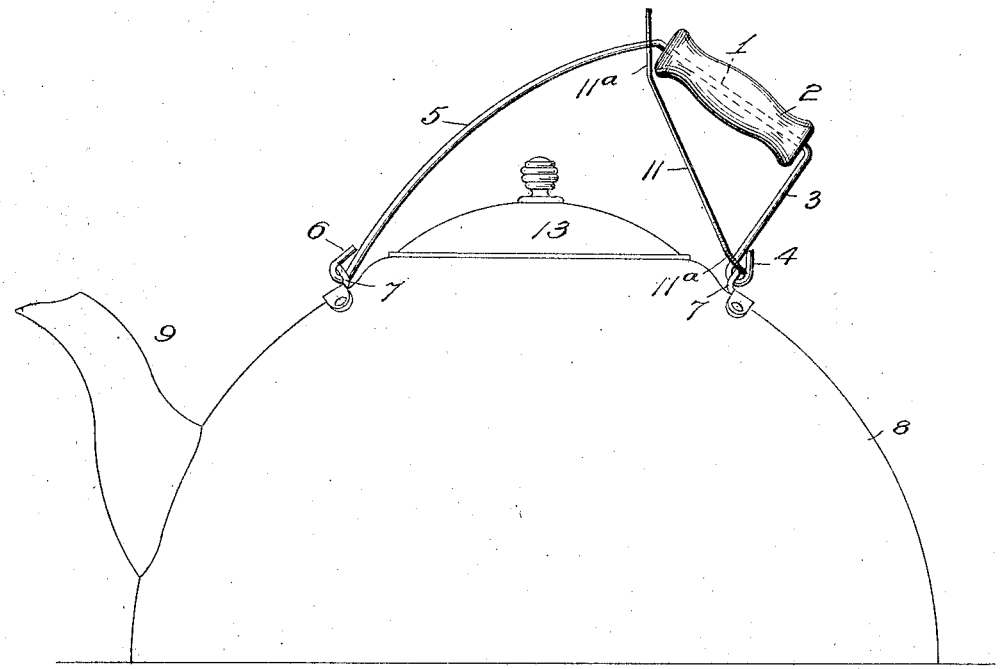
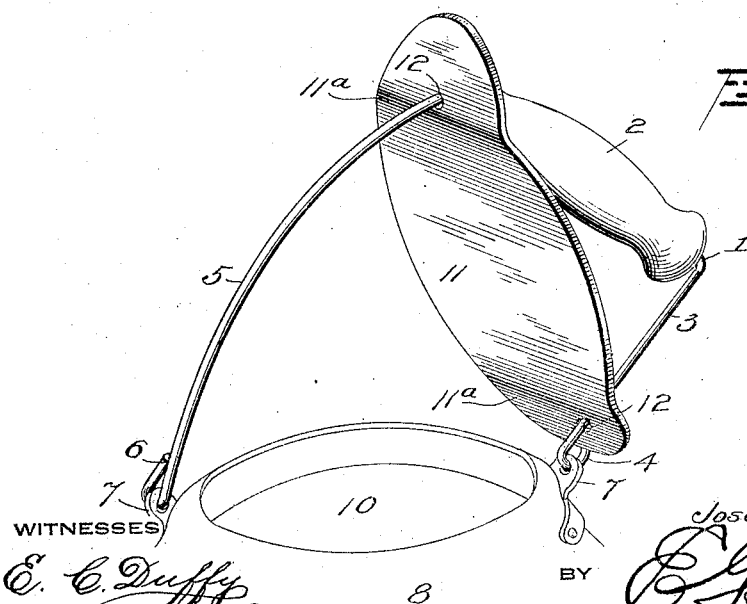

UNITED STATES PATENT OFFICE.

JOSEPH V. LAFOND, OF CHICAGO, ILLINOIS.

HANDLE AND PROTECTOR FOR TEAKETTLES.

1,388,958.  Specification of Letters Patent.  Patented Aug. 30, 1921.

Application filed February 17, 1920. Serial No. 359,454.

*To all whom it may concern:*

Be it known that I, JOSEPH V. LAFOND, a citizen of the United States, residing at Chicago, in the county of Cook and State of Illinois, have invented a new and useful Handle and Protector for Teakettles, of which the following is a specification.

This invention relates to handles and protectors for tea kettles.

The object is to provide a handle for tea kettles which is adapted to support a shield or protector for deflecting the steam from the kettle away from the hand while in the act of pouring water therefrom, and to support such shield or protector in such manner that the latter will not interfere with pouring water into the kettle when it is desired to refill the same, the said shield being also in a position so as not to interfere with the free application or removal of the lid of the kettle, and the handle being so located as to facilitate the pouring action.

A further object is to provide such a device which will not add materially to the cost of manufacture of the kettle, and to so construct the same that it may be readily applied to ordinary kettles, along with the handle therefor, thus replacing the handles now in common use, the present device being capable of attachment to the kettle in the same manner as ordinary handles.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which similar reference characters designate corresponding parts throughout the several figures, Figure 1 is a side elevation of the improved handle and shield or protector applied to an ordinary tea kettle, the latter being indicated in outline;

Fig. 2 is a detail perspective view of the improved device and the adjacent portion of the kettle.

It is often desirable to fill a tea kettle before it is entirely empty and while it contains a quantity of steaming water, and a common practice is to carry the kettle to a faucet, remove the lid and let fresh water run therein, which often results in the scalding of the hands of the operator, for the reason that the ordinary handle is located immediately above the filling opening of the kettle and in grasping such handle, the hand is in the direct path of the rising steam. In addition such a handle materially interferes with the flow of the fresh water while filling the kettle; it being sometimes necessary to use both hands to properly support the kettle for such purpose. The ordinary handle is also objectionable while in the act of pouring boiling or steaming water from the spout of the kettle as, in tilting the latter to lower the mouth of the spout, the hand is brought directly over the point of egress and the steam is free to rise directly into contact with the supporting hand.

The improved handle and shield or protector is designed to overcome these defects and is constructed in the following manner.

A bail constructed of the proper gage of steel wire is bent to form a handle-traversing or bearing portion 1, upon which is mounted in the usual manner, an ordinary spool handle 2, preferably formed of suitable wood and of sufficient length to accommodate the hand of the operator. The wire comprising the bail is then bent, at one end, at right angles to the bearing portion 1, to provide an arm as indicated at 3, and provided at its terminal with a looped end, forming an eye 4. The other end of the bail wire is bent at an obtuse angle to the bearing portion 1 to provide an arm 5 which is curved outwardly and provided at its terminal with a corresponding eye 6, the ends of the wire forming the eyes 4 and 6 being each bent outwardly and away from each other, as clearly shown in Fig. 1 of the drawing. The portions 1, 3 and 5 of the wire bail all lie in the same plane, the arm 3 constituting a short straight arm and the arm 5 constituting a long curved arm so that, when the eyes 4 and 6 are properly attached, in the ordinary manner, to the perforated ears 7 of the tea kettle 8, with the eye of the long arm 5 engaged with that ear 7 located adjacent to the spout 9 of the kettle and the eye of the short arm 3 engaging the opposite ear, it will be seen that the handle 2 is offset and arranged at an angle to the horizontal, substantially to the rear of the filling opening 10 of the kettle, and substantially parallel with the pouring spout.

Mounted on the bail is a flat tin or other thin sheet metal shield or protector 11, which may be round, oval or any other shape, and provided with a pair of spaced apertures 12, one of which is adapted to be traversed by the upper rear end of the long curved arm 5 where joined to the bearing portion 1 of the bail, and the other aperture 12 being engaged to the lower end of the short arm 3 within the adjacent eye 4, so that, when the bail is applied to the kettle in the manner described, the shield or protector 11 is supported between the handle 2 and the filling opening 10 of the kettle at an angle to said handle and almost wholly to one side of said opening.

The shield 11 is slightly bent at opposite ends, as indicated at 11ª, so as to be spaced from the handle 2, whereby sufficient room is given for the fingers to grasp the handle. The engagement of the eye 4 with the shield 11 and bent end 11ª of the shield in conjunction with the curvature of the long arm 5, holds the shield in its position on the bail and prevents it from displacement relative to the handle.

It will be seen that when the lid 13 of the kettle is removed the steam therefrom will be deflected away from the hand of the operator which will thus be fully protected, and that the kettle may then be easily filled with fresh water while being supported with one hand, and it will also be seen that when pouring water from the spout of the kettle, with the lid 13 still in position in the filling opening 10, the hand is fully protected from the steam issuing from the spout.

The device is so simple of construction as to render the same capable of being manufactured and installed on tea kettles or similar utensils without materially adding to the cost thereof and the same will act to properly support the kettle in the desired manner and to fully protect the hand of the operator at all times.

What is claimed is:—

1. The combination with a kettle having a filling opening and a pair of ears bordering the filling opening, of a bail having its ends formed with eyes connected to said ears, said bail having an intermediate handling portion, and long and short arms joining the handling portion to the eyes; said handling portion lying partly to one side of the filling opening, and a shield arranged below the handling portion having one of its ends connected with the eye of the short arm and the other end connected with the handling portion of the bail near the long arm.

2. In combination with a kettle having a filling opening provided with a lid, and ears in front and rear of the filling opening, a bail having its ends formed with eyes connected with said ears, said bail consisting of a long arm, a short arm, and a handle-bearing portion, the long arm being connected to the front ear and the short arm to the rear ear of the kettle, a handle mounted on said handle-bearing portion, the disposition of said arms causing the handle to assume an inclined position partly in rear of the filling opening of the kettle, and a shield connected with the two arms of the bail and arranged in an inclined position in advance of the handle.

3. A tea kettle handle and protector comprising a bail formed of wire bent intermediate of its length to form a handle carrying portion, a handle mounted thereon, one end of the wire bail being bent at right angles to the handle to form a short arm terminating in an eye adapted to engage the ear of the kettle remote from the spout thereof, the other longer end of the wire bail being bent and curved outwardly, forwardly and away from the short arm and terminating in an eye for engagement with the opposite ear of the kettle to support the front end of the handle at a higher elevation than the rear end and partly in rear of the filling opening of the kettle, and a shield or protector connected to the bail at its high point and connected to the eye of the short arm to support said shield partly in the rear of said filling opening in an inclined position and in spaced relation to the handle.

In testimony that I claim the foregoing as my own, I have hereto affixed my signature.

JOSEPH V. LAFOND.